United States Patent [19]
Andresen et al.

[11] Patent Number: 5,761,608
[45] Date of Patent: Jun. 2, 1998

[54] METHOD AND APPARATUS FOR INTER-NODE HANDOFF OF A RADIO FREQUENCY COMMUNICATION UNIT

[75] Inventors: Michael J. Andresen, Apache Junction; Keith Andrew Olds, Mesa, both of Ariz.; Christopher Neil Kurby, Elmhurst; Bradley B. Bakke, Lake in The Hills, both of Ill.

[73] Assignee: Motorola, Inc., Schaumburg, Ill.

[21] Appl. No.: 617,723

[22] Filed: Apr. 1, 1996

[51] Int. Cl.$^6$ .................................................. H04B 7/185
[52] U.S. Cl. ............................................. 455/13.1; 455/436
[58] Field of Search .................................. 455/12.1, 13.1, 455/33.2, 33.4, 37.1, 51.1, 54.1, 62, 132, 436, 437, 438, 442, 443, 427; 375/59, 60

[56] References Cited

U.S. PATENT DOCUMENTS

| | | | |
|---|---|---|---|
| 5,293,423 | 3/1994 | Dahlin et al. | 380/48 |
| 5,408,517 | 4/1995 | Nyhart et al. | 379/60 |
| 5,440,562 | 8/1995 | Culter | 307/108 |
| 5,479,409 | 12/1995 | Dupuy et al. | 370/95.3 |
| 5,561,838 | 10/1996 | Chandos et al. | 455/13.1 |

*Primary Examiner*—Nguyen Vo
*Assistant Examiner*—Darnell R. Armstrong
*Attorney, Agent, or Firm*—Sherry J. Whitney

[57] ABSTRACT

A method for a radio frequency communication unit (110) (CU) to hand off from a losing node (120) to a gaining node (122) estimates a gaining node uplink time (210) and a gaining node uplink frequency (212), which the gaining node uplink signal comprises. During handoff, the CU (110) ceases communications with the losing node (120) and immediately begins communications with the gaining node (122) using the uplink time and uplink frequency. A CU apparatus (300) uses a processor (302) for carrying out calculations necessary for estimating the gaining node uplink time and frequency. Information necessary for the calculations, such as a downlink signal time-of-arrival and Doppler offset, are collected by a CU receiver (306). The CU receiver (306) and a CU transmitter (304) are used to support downlink signals (142) and uplink signals (140), respectively, between the CU (110) and a node (120, 122).

22 Claims, 2 Drawing Sheets

METHOD AND APPARATUS FOR INTER-NODE HANDOFF OF A RADIO FREQUENCY COMMUNICATION UNIT

FIELD OF THE INVENTION

This invention relates generally to radio telecommunications and, more particularly, to handing off a radio frequency communication unit from one system node to another system node.

BACKGROUND OF THE INVENTION

During a call within a mobile communication system, a communication unit (CU) maintains a channel with a system antenna, or "system node", which provides communication services to the area in which the CU is located. A system node can be, for example, a ground-based cellular base station or a satellite. When the CU transitions into an area covered by a different system node, the CU must be handed off to the different system node or the call will be dropped.

As used herein, the system node whose coverage area the CU is leaving (i.e., the node from which the CU is being handed off) is referred to as the "losing node". The system node whose coverage area the CU is entering (i.e., the node to which the CU is being handed off) is referred to as the "gaining node". Handoff between a losing node and a gaining node is referred to herein as an "inter-node handoff".

A CU transitions into the coverage area of a gaining node due to the relative motion of the system nodes to the CU. For example, where system nodes are stationary (e.g., ground-based system nodes or satellite system nodes with earth-fixed coverage areas), the CU would have physically to relocate to enter the coverage area of the gaining node. Where the coverage areas of system nodes move relative to the surface of the earth (e.g., non-geosynchronous satellite system nodes with satellite-fixed coverage areas), the CU does not need to move to enter the coverage area of the gaining node. In such a case, the coverage area moves over the CU.

Prior art methods of handing off a CU from a losing node to a gaining node use either "make-before-break" or "break-before-make" handoff sequences. A "make-before-break" handoff sequence requires a CU to be capable of sustaining two simultaneous traffic channels during handoff: one with the losing node and one with the gaining node. When a handoff is in progress, the CU maintains the traffic channel with the losing node while establishing a new traffic channel with the gaining node. Once the new traffic channel is established, the CU drops the traffic channel with the losing node. The "make-before-break" handoff sequence is undesirable because the CU requires extra hardware to maintain the two simultaneous traffic channels.

A prior art "break-before-make" handoff sequence does not require a CU to maintain simultaneous traffic channels. When a handoff is in progress, the traffic channel to the losing node is dropped, the CU synchronizes to the gaining node, and a new traffic channel to the gaining node is established. Synchronization before traffic packet transmission is necessary in a mobile system because the Doppler offset and propagation delay between the CU and the gaining node requires the CU to adjust its packet transmission frequency and time prior to sending traffic packets. The Doppler offset and propagation delay are determined during synchronization and, because both vary during operation, also during maintenance of a traffic channel.

A drawback to the "break-before-make" handoff sequence is that a condition referred to as "drop-out" occurs during the time period when the CU is synchronizing with the gaining node. During drop-out, voice or data traffic packets from the CU are not received by any system node. Thus, a break in the voice or data transmission stream results. This break results in diminished voice quality and/or corrupted data.

What is needed is a method and apparatus for handing off a CU from a losing node to a gaining node which does not require additional CU hardware in order simultaneously to maintain multiple traffic channels. Further needed is a method and apparatus for handing off a CU which does not result in dropped CU voice and/or data packets.

DETAILED DESCRIPTION OF THE DRAWINGS

The method and apparatus of the present invention enables a communication unit (CU) to be handed off from a losing node to a gaining node without maintaining multiple traffic channels. In addition, the method and apparatus of the present invention enables a CU to be handed off without dropping CU voice and/or data packets. The method and apparatus achieves these advantages over the prior art by using a "simultaneous make-break" handoff sequence. The simultaneous make-break handoff involves dropping the traffic channel to the losing node while instantly establishing the traffic channel to the gaining node. The method and apparatus of the present invention makes this possible by eliminating the necessity for synchronization with the gaining node prior to sending traffic packets to the gaining node.

A preferred embodiment of the method and apparatus of the present invention is described herein using an exemplary non-geosynchronous satellite communication system having satellite-fixed coverage areas. Although the description depicts such a satellite communication system, the method and apparatus of the present invention could also be used in a ground-based communication system, a geosynchronous satellite system, a satellite system which uses earth-fixed coverage areas, or a communication system which uses a combination of the aforementioned types of system nodes. Any system which gives rise to Doppler shifts, propagation delays, and the need for CU handoffs between system nodes could employ the method and apparatus of the present invention. Therefore, the description of a satellite communication system is for exemplary purposes only and should not be construed to limit the scope of the present invention.

Figure 1:
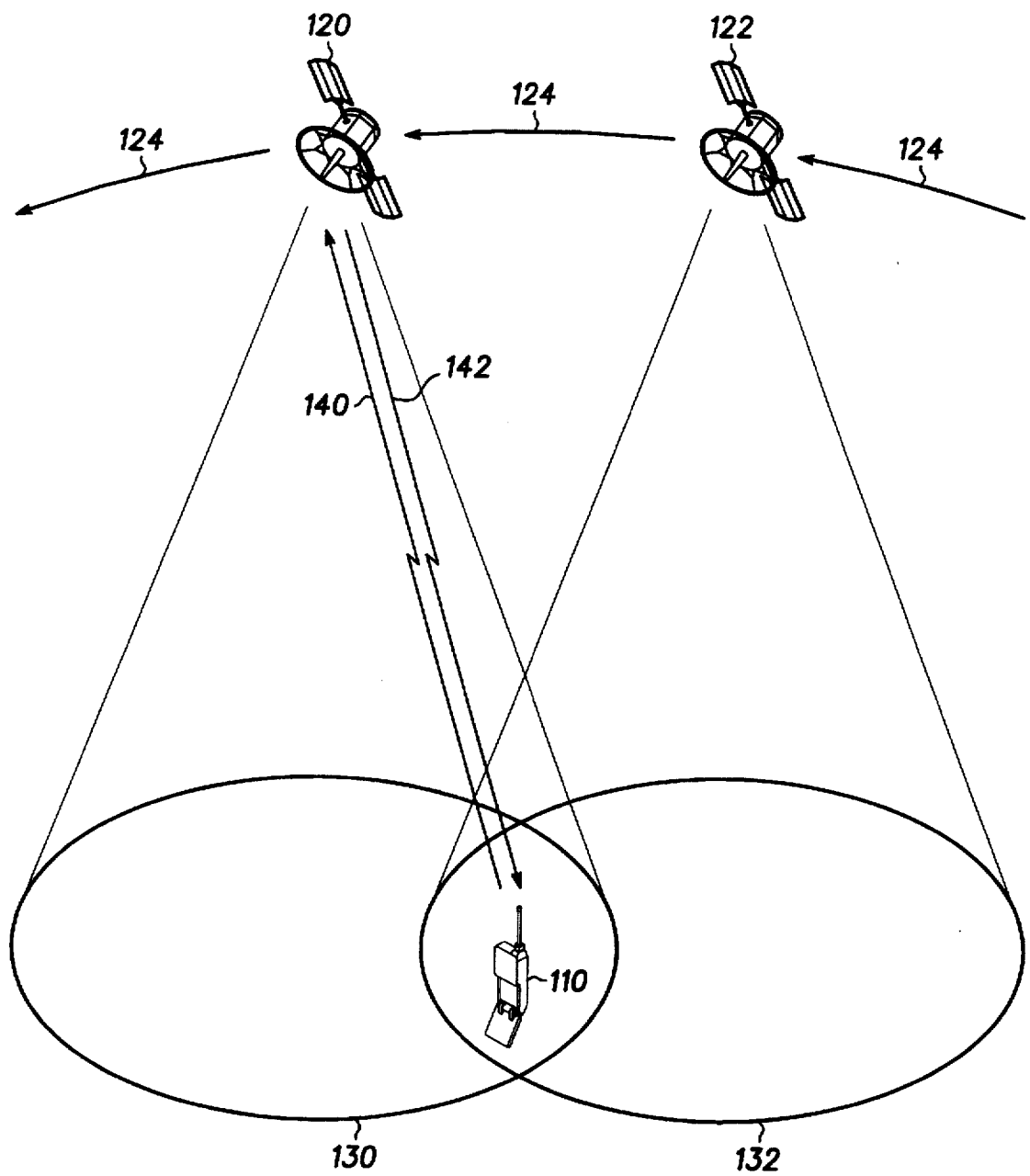
FIG. 1 illustrates a radio telecommunication system in accordance with a preferred embodiment of the present invention.

FIG. 1 illustrates radio telecommunication system 100 in accordance with a preferred embodiment of the present invention. System 100 comprises one or more CUs 110, and at least two satellites 120, 122 which function as system nodes. CUs 110 can be any radio frequency (RF) telecommunication device such as, for example, stationary or mobile radios, cellular telephones, facsimile, or data devices.

Although communication system 100 functions to provide communication between CU 110 and other communication devices, hardware which is not essential to the description of the method and apparatus of the present invention is not shown for ease of description. Such hardware (not shown) could include, for example, switching gateways, public switched telephone networks (PSTN), system control facilities, and other RF or hard-wired communication terminals.

In a preferred embodiment, satellites 120, 122 are non-geosynchronous satellites which are shown to travel along path 124, although satellites 120, 122 could travel along different paths. As described previously, the method and apparatus of the present invention, in alternate embodiments, could use geosynchronous satellites, ground-based system nodes, or a combination of non-geosynchronous, geosynchronous, and/or ground-based system nodes.

Satellites 120, 122 are designed to provide communications capabilities within coverage areas 130, 132. Thus, as long as CU 110 is located within coverage area 130, CU 110 normally would be able to maintain a channel with satellite 120. In a preferred embodiment, coverage areas 130, 132 are "satellite-fixed", meaning that coverage areas 130, 132 move across the surface of the earth in relation to the movement of satellites 120, 122. As was described previously, in an alternate embodiment, satellites 120, 122 could have coverage areas 130, 132 which are "earth-fixed", meaning that the centers of coverage areas 130, 132 do not substantially move with respect to the surface of the earth, although the shape of coverage areas 130, 132 could change as satellites 120, 122 move in their orbits.

Satellites 120, 122 communicate with CU 110 over uplink 140 and downlink 142 which carry uplink signals and downlink signals, respectively. Uplink 140 is an RF carrier of voice and/or data packets emanating from CU 110 and destined for satellite 120. Downlink 142 is an RF carrier of voice and/or data packets emanating from satellites 120, 122 and destined for CU 110. Although the terms "uplink" and "downlink" are used, they are not meant to limit the method and apparatus of the present invention to embodiments where system nodes are at higher elevations with respect to CU 110. The terms are meant equally to apply to embodiments, such as systems using ground-based system nodes, where system nodes are at equal or lower elevations with respect to CU 110.

As described previously, CU 110 and coverage areas 130, 132 often move relative to each other, whether by motion of CU 110, by motion of coverage areas 130, 132, or motion of both. In a preferred embodiment, where satellites 120, 122 move along path 124, satellite-fixed coverage areas 130, 132 move with respect to the surface of the earth and, thus, with respect to CUs 110. In FIG. 1, CU 110 is shown to be located in both coverage areas 120, 122. However, as satellites 120, 122 move along path 124, coverage area 130 will no longer encompass CU 110. Instead, coverage area 132 will encompass CU 110. Thus, a handoff of the CU from satellite 120 to satellite 122 will be necessary in order to maintain a communication link with CU 110. In this situation, satellite 120 is a "losing node" and satellite 122 is a "gaining node".

The handoff must take into account the fact that the Doppler offset and propagation delay between satellite 120 and CU 110 will most likely differ from the Doppler offset and propagation delay between satellite 122 and CU 110. Doppler offset and propagation delay are important parameters which CU 110 uses to synchronize with satellites 120. CU 110 must adjust its transmit and receive frequencies to compensate for the Doppler offset between CU 110 and a system node. Otherwise CU 110 cannot accurately and successfully transmit and receive voice and/or data packets.

Similarly, CU 110 must adjust its transmit and receive times to compensate for the propagation delay between CU 110 and a system node so that CU 110 can successfully and accurately transmit and receive voice and/or data packets.

In prior art systems, Doppler offset and propagation delay between a CU and a gaining satellite are evaluated and compensated for during a synchronization procedure which precedes any exchange of voice and/or data traffic packets. As will be described below, the method and apparatus of the present invention eliminates the need for a synchronization procedure between CU 110 and gaining satellite 122. This enables CU 110 to establish a new traffic channel with gaining satellite 122 simultaneously with dropping the traffic channel with losing satellite 120. This simultaneous make-break handoff procedure results in no dropped uplink traffic packets during handoff, and does not require additional CU hardware.

In a preferred embodiment, satellites 120, 122 are synchronized in time and frequency. Thus, the system clocks and channel frequency settings for each satellite 120, 122 are substantially the same, except for clock and frequency errors which might result from clock/frequency drift or hardware inaccuracies and malfunctions. The time to which satellites 120, 122 are synchronized is referred to herein as the "system time". Similarly, a channel frequency setting to which satellites 120, 122 are synchronized is referred to herein as the "system frequency". Although only one system time and system frequency are used herein for exemplary purposes, multiple synchronized system times and system frequencies might be employed by a communication system.

Figure 2:
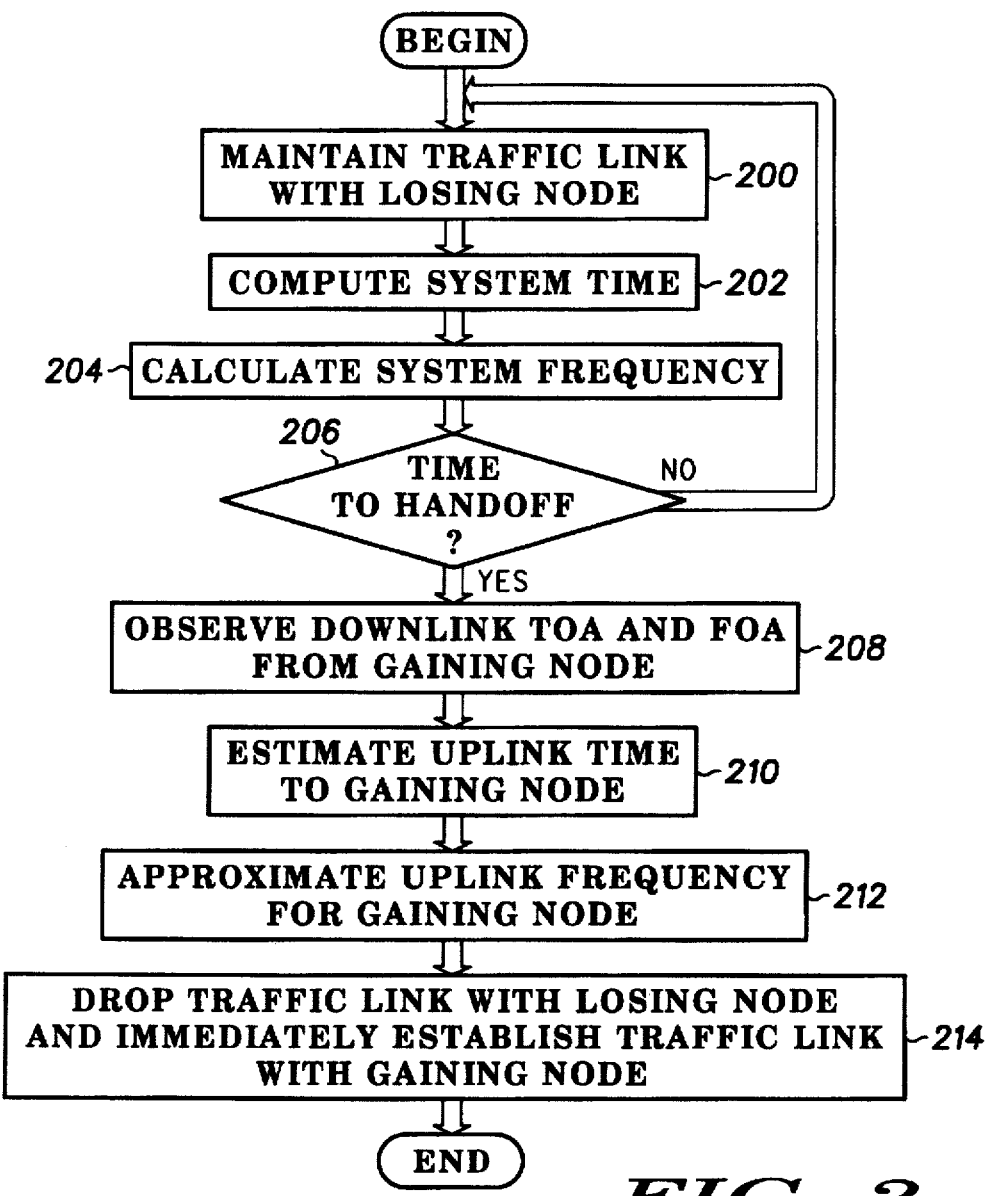
FIG. 2 illustrates a flowchart of a method for handing off a communication unit (CU) from a losing node to a gaining node in accordance with a preferred embodiment of the present invention.

FIG. 2 illustrates a flowchart of a method for handing off a CU from a losing node to a gaining node in accordance with a preferred embodiment of the present invention. The method is performed by a CU and begins when the step 200 of maintaining a traffic link with a losing node is occurring. Maintenance of the traffic link involves the exchange of uplink and/or downlink traffic packets between a CU (e.g., CU 110, FIG. 1) and a losing system node (e.g., satellite 120, FIG. 1).

As described previously, Doppler offset and propagation delay between a CU and a system node affect adjustments to a CU's transmit/receive frequency settings and transmit/receive times. Doppler offset is a function of the relative velocity of the system node to the CU. Because Doppler offset effects the perceived frequency of a signal, Doppler offset is relevant to the frequency at which a traffic packet is transmitted. Propagation delay is a function of the distance between the CU and the system node. Because a signal takes time to travel this distance, propagation delay is relevant to the time at which a traffic packet is transmitted.

As described previously, the CU and the losing/gaining nodes move relative to each other. This movement causes the Doppler offset and propagation delay to change with time. The Doppler offset and propagation delay relative to the losing node can be used to calculate the system time and system frequency.

In step 202, the system time is computed using measurements of the propagation delay between the CU and the losing node. Under normal tracking operations, the CU adjusts its downlink clock late relative to the losing node clock and its uplink clock early relative to the losing node clock to account for propagation delay. The CU measures the losing node downlink time (i.e., the time when the CU receives the losing node downlink signal) and the losing node uplink time (i.e., the time when the CU sends the losing node uplink signal). By taking an average of the losing node downlink time and uplink time, the CU can compute the losing node time. Because the system nodes are time-synchronized, the computed losing node time represents an accurate estimate of the system time.

In step 204, the system frequency is calculated using measurements of the Doppler offset between the CU and the losing node. Under normal tracking operations, the CU adjusts its downlink frequency relative to the losing node Doppler shifted carrier and its uplink frequency to compensate for Doppler offset such that the CU's transmission arrives on-frequency at the losing node. The CU measures the losing node downlink frequency (i.e., the frequency at which the CU receives the losing node downlink signal) and the losing node uplink frequency (i.e. the frequency at which the CU sends the losing node uplink signal). By taking an average of the adjusted losing node downlink and uplink frequencies, the CU can calculate the losing node frequency. Because the system nodes are frequency-synchronized, the calculated losing node frequency represents an accurate estimate of the system frequency. In alternate embodiments, the CU could use other analysis schemes over longer durations which might result in more accurate estimates of system time and frequency.

In alternate embodiments, the CU might not calculate either or both the system time and system frequency. For example, the CU might have knowledge of the system time and system frequency independent of any CU calculations (e.g., the system time and/or system frequency could be sent to the CU by a node).

A determination is made in step 206 whether a time to handoff has arrived. A time to handoff might arrive when, for example, the system sends a handoff order message to the CU. Alternatively, the CU might determine whether or not it wants to handoff, for example, based on varying signal qualities between system nodes, differing communication rates between system nodes (e.g., when the CU is handing off between different communication systems), or other criteria. When step 206 indicates that it is not time to handoff, the method iterates as shown in FIG. 2.

When step 206 indicates that it is time to initiate a handoff, the downlink time-of-arrival (TOA) and frequency-of-arrival (FOA) of a downlink signal emanating from the gaining node are observed by the CU receiver in step 208.

In a preferred embodiment, in order to handoff to the gaining node, the CU determines uplink signal parameters which describe the uplink signal to the gaining node. These parameters comprise the gaining node uplink time and the gaining node uplink frequency. The gaining node uplink time is a time at which the CU should transmit the gaining node uplink signal to the gaining node if the gaining node uplink signal is properly to be received at the gaining node. The gaining node uplink frequency is a frequency at which the CU should transmit the gaining node uplink signal to the gaining node if the gaining node uplink signal is properly to be received at the gaining node. In alternate embodiments, devices other than the CU can calculate the uplink signal parameters and send the uplink signal parameters to the CU.

In a preferred embodiment, steps 202 and 208 are precursors to estimating the gaining node uplink time. In step 210, the uplink time to the gaining node is estimated using the observed downlink TOA from step 208 and the system time computed in step 202. First, the propagation delay is derived by calculating a difference between the observed downlink TOA and the system time. Normally, the observed downlink TOA will be a time which is later than the system time by a time span equal to the propagation delay. The estimated gaining node uplink time, thus, is a time which is earlier than the system time by a time span equal to the propagation delay. In other words, the estimated gaining node uplink time is the system time adjusted by a negative of the difference between the observed downlink TOA and the system time.

As described previously, multiple synchronized system times could be employed by a communication system. For example, a communication system could use a time division multiple access (TDMA) communications protocol. In a TDMA system, multiple time slots are available to a CU and these multiple available time slots are synchronized between system nodes. An RF communication channel between a system node and a CU is at least partially defined by a particular time slot of the multiple available time slots. During handoff from a losing node to a gaining node, the time slot assigned for communications with the losing node often differs from the time slot assigned for communications with the gaining node. Where the time slots between nodes differ, the determination of the gaining node uplink time must take into account a time shift between the losing node and gaining node time slots. This time shift is equivalent to a time difference between the losing node and gaining node time slots. Thus, after the estimated gaining node uplink time is determined as described above, the estimated gaining node uplink time must be adjusted by the time shift in order to synchronize the CU to the assigned gaining node channel.

In a preferred embodiment, steps 204 and 208 are precursors to approximating the gaining node uplink frequency. In step 212, the uplink frequency for the gaining node is approximated using the observed downlink FOA and the system frequency calculated in step 204. First, the Doppler offset is determined by calculating a difference between the observed downlink FOA and the system frequency.

If the gaining node is approaching the CU, the observed downlink FOA normally will be a frequency which is higher than the system frequency by the Doppler offset, and the estimated gaining node uplink frequency will be a frequency which is lower than the system frequency by the Doppler offset. Consequently, if the gaining node is moving away from the CU, the observed downlink FOA normally will be a frequency which is lower than the system frequency by the Doppler offset, and the estimated gaining node uplink frequency will be a frequency which is higher than the system frequency by the Doppler offset. In other words, the approximated gaining node uplink frequency is the system frequency adjusted by a negative of the difference between the observed downlink FOA and the system frequency.

In alternate embodiments, the CU might not calculate either or both the gaining node uplink time and gaining node uplink frequency. For example, the CU might have knowledge of the gaining node uplink time and gaining node uplink frequency independent of any CU calculations (e.g., the gaining node uplink time and/or frequency could be sent to the CU by a node).

As described previously, multiple synchronized system frequencies could be employed by a communication system. For example, a communication system could use a frequency division multiple access (FDMA) communications protocol. In an FDMA system, multiple frequencies are available to a CU and these multiple available frequencies are synchronized between system nodes. An assigned RF communication channel between a system node and a CU is at least partially defined by a particular frequency of the multiple available frequencies. During handoff from a losing node to a gaining node, the frequency assigned for communications with the losing node often differs from the frequency assigned for communications with the gaining node. Where the frequencies between nodes differ, the determination of the gaining node uplink frequency must take into account a frequency shift between the losing node and gaining node frequencies. This frequency shift is equivalent to a frequency difference between the losing node and gaining node assigned frequencies. Thus, after the estimated gaining node uplink frequency is determined as described above, the estimated gaining node uplink frequency must be adjusted by the frequency shift in order to synchronize the CU to the assigned gaining node channel.

In a preferred embodiment, handoff from the losing node to the gaining node is based on the gaining node uplink time and gaining node uplink frequency. At the moment the handoff occurs, in step 214, the CU drops the traffic link with the losing node by ceasing communications with the losing node, immediately adjusts its uplink time and frequency to the values estimated in steps 210 and 212 (i.e., the gaining node uplink signal parameters), and establishes a traffic link with the gaining node by beginning to transmit uplink traffic packets to the gaining node at the estimated gaining node uplink time and frequency. Once the CU begins transmitting uplink packets to the gaining node, handoff is complete and the method ends.

As described previously, in a preferred embodiment, estimates of the system time and system frequency are derived by calculating averages of the losing node uplink/downlink times and uplink/downlink frequencies, respectively. Further, in a preferred embodiment, the derived system time and system frequency are used, along with an observed TOA and FOA of a signal from the gaining node, to form an estimate of the uplink time and frequency, respectively. In alternate embodiments, different methods of estimating the uplink time and frequency can be used. The particular method used is not crucial to the method and apparatus of the present invention. What is important is that estimates of the uplink time and frequency are made prior to handoff between the losing and gaining nodes. Therefore, the above embodiment for estimating the uplink time and frequency are not meant to limit the scope of the present invention.

Figure 3:
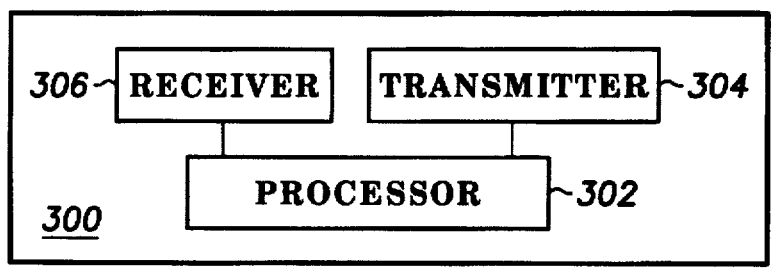
FIG. 3 illustrates a block diagram of a CU in accordance with a preferred embodiment of the present invention.

FIG. 3 illustrates a block diagram of CU 300 in accordance with a preferred embodiment of the present invention. CU 300 comprises processor 302, RF transmitter 304, and RF receiver 306. RF transmitter 304 and RF receiver 306 are used to transmit RF signals to and receive RF signals from a system node.

When a signal is received from a system node by RF receiver 306, RF receiver 306 can measure Doppler offset and TOA relative to the system node. From the TOA, processor 302 is capable of computing the propagation delay between CU 300 and the system node. The Doppler offset and propagation delay relative to the losing node enable processor 302 to compute the system time and system frequency.

When the necessity for a handoff arises, processor 302 commands RF receiver 306 to observe the downlink TOA and FOA of a signal from a gaining system node. Using the observed downlink TOA and FOA, and the computed system time and frequency, processor 302 calculates the propagation delay to the gaining node. The Doppler offset and propagation delay enable processor 302 to estimate the uplink time and frequency to the gaining node.

Processor 302 can then simultaneously drop the traffic link with the losing node and establish a traffic link with a gaining node using the estimated gaining node uplink time and frequency. Thus, the CU transmitter does not need to send an uplink signal to the losing node and the gaining node simultaneously. This enables a CU handoff from a losing node to a gaining node using one set of uplink communications equipment for both the uplink signal to the losing node and the uplink signal to the gaining node.

The method and apparatus of the present invention achieves the results that no uplink traffic packets are dropped during a handoff and CU 300 is not required to maintain two uplink traffic channels during handoff. In alternate embodiments, the functions performed by processor 302 and RF receiver 306 could be performed by multiple and/or different processors (not shown) within CU 300.

In summary, the method and apparatus of the present invention eliminates the need to perform a synchronization procedure prior to handing off to a gaining node. This enables a CU handoff to occur without having to support traffic channels with both the gaining and losing nodes and also without dropping uplink traffic packets. Thus, the method and apparatus of the present invention enables handoff to occur without the need for additional CU hardware and also without impacting voice and/or data quality.

While the principles of the invention have been described above in connection with specific apparatus, it is to be clearly understood that this description is made only by way of example and not as a limitation on the scope of the invention.

What is claimed is:

1. A method for a communication unit (CU) to hand off from a losing node to a gaining node, wherein the CU is a radio frequency device capable of communicating with a node using an uplink signal from the CU to the node and a downlink signal from the node to the CU, the method comprising the steps of:

a) estimating a gaining node uplink time at which the CU should transmit the uplink signal to the gaining node, wherein the gaining node uplink time is estimated from observing times-of-arrival (TOA) of signals between the communication unit and both the losing node and the gaining node;

b) approximating a gaining node uplink frequency at which the CU should transmit the uplink signal to the gaining node, wherein the gaining node uplink frequency is approximated from observing frequencies-of-arrival (FOA) of the signals between the communication unit and both the losing node and the gaining node; and c) handing off from the losing node to the gaining node using the gaining node uplink time and the gaining node uplink frequency without performing a synchronization procedure between the CU and the gaining node, wherein a first link between the communication unit and the losing node is broken substantially simultaneously with a second link between the communication unit and the gaining node being made.

2. The method as claimed in claim 1, wherein the step of estimating the gaining node uplink time comprises the steps of:

a1) computing a system time to which the losing node and the gaining node are synchronized;

a2) observing a gaining node time-of-arrival (TOA) of a gaining node downlink signal;

a3) calculating a difference between the system time and the gaining node TOA; and a4) estimating the gaining node uplink time as the system time adjusted by a negative of the difference.

3. The method as claimed in claim 2, wherein the step of computing the system time comprises the steps of:

a1a) measuring a losing node downlink time at which the CU receives a losing node downlink signal;

a1b) measuring a losing node uplink time at which the CU sends a losing node uplink signal; and a1c) computing the system time as an average of the losing node downlink time and the losing node uplink time.

4. The method as claimed in claim 1, wherein the step of approximating the gaining node uplink frequency comprises the steps of:

b1) calculating a system frequency at which the losing node and the gaining node are synchronized;

b2) observing a gaining node frequency-of-arrival (FOA) of a gaining node downlink signal;

b3) determining a difference between the system frequency and the gaining node FOA; and b4) approximating the gaining node uplink frequency as the system frequency adjusted by a negative of the difference.

5. The method as claimed in claim 4, wherein the step of calculating the system frequency comprises the steps of:

b1a) measuring a losing node downlink frequency at which the CU receives a losing node downlink signal;

b1b) measuring a losing node uplink frequency at which the CU sends a losing node uplink signal; and b1c) calculating the system frequency as an average of the losing node downlink frequency and the losing node uplink frequency.

6. The method as claimed in claim 1, wherein the step of estimating the gaining node uplink time comprises the steps of:

a1) deriving a propagation delay between the CU and the gaining node; and a2) estimating the gaining node uplink time as a system time to which the losing node and the gaining node are synchronized adjusted by the propagation delay.

7. The method as claimed in claim 6, wherein the step of deriving the propagation delay comprises the steps of:

a1a) observing a gaining node time-of-arrival (TOA) of a gaining node downlink signal;

a1b) calculating a difference between the system time and the gaining node TOA; and a1c) deriving the propagation delay as the difference.

8. The method as claimed in claim 1, wherein the step of approximating the gaining node uplink frequency comprises the steps of:

b1) determining a Doppler offset between the CU and the gaining node; and b2) approximating the gaining node uplink frequency as a system frequency to which the losing node and the gaining node are synchronized adjusted by the Doppler offset.

9. The method as claimed in claim 8, wherein the step of determining the Doppler offset comprises the steps of:

b1a) observing a gaining node frequency-of-arrival (FOA) of a gaining node downlink signal;

b1b) calculating a difference between the system frequency and the gaining node FOA; and b1c) determining the Doppler offset as the difference.

10. The method as claimed in claim 1, wherein the step of handing off from the losing node to the gaining node comprises the step of ceasing communications with the losing node and immediately beginning to communicate with the gaining node at the gaining node uplink time and using the gaining node uplink frequency.

11. A method for a communication unit (CU) to hand off from a losing node to a gaining node, wherein the CU is a radio frequency device capable of communicating with a node using an uplink signal from the CU to the node and a downlink signal from the node to the CU, the method comprising the steps of:

a) determining uplink signal parameters describing a gaining node uplink signal between the communication unit and the gaining node, wherein the uplink signal parameters are determined through observations of times-of-arrival (TOA) of signals between the communication unit and both the losing node and the gaining node and through observations of frequencies-of-arrival (FOA) of the signals between the communication unit and both the losing node and the gaining node; and b) handing off from the losing node to the gaining node without performing a synchronization procedure between the CU and the gaining node, wherein handing off is performed by ceasing uplink communications with the losing node and substantially simultaneously beginning uplink communications with the gaining node using the uplink signal parameters.

12. The method as claimed in claim 11, wherein the uplink signal parameters comprise a gaining node uplink time which is a time at which the CU should transmit the gaining node uplink signal to the gaining node if the gaining node uplink signal is properly to be received at the gaining node, and the step of determining the uplink signal parameters comprises the steps of:

a1) observing a gaining node time-of-arrival (TOA) of a gaining node downlink signal;

a2) calculating a difference between the gaining node TOA and a system time to which the losing node and the gaining node are synchronized; and a3) determining the gaining node uplink time as the system time adjusted by a negative of the difference.

13. The method as claimed in claim 12, wherein the step of determining the gaining node uplink time comprises the steps of:

a3a) determining the gaining node uplink time as the system time adjusted by the negative of the difference between the gaining node TOA and the system time; and a3b) adjusting the gaining node uplink time by a time shift equal to a second difference between a first time slot which is assigned to the CU for communications with the losing node and a second time slot which is assigned to the CU for communications with the gaining node.

14. The method as claimed in claim 11, wherein the uplink signal parameters comprise a gaining node uplink frequency which is a frequency at which the CU should transmit the gaining node uplink signal to the gaining node if the gaining node uplink signal is properly to be received at the gaining node, and the step of determining the uplink signal parameters comprises the steps of:

a1) observing a gaining node frequency-of-arrival (FOA) of a gaining node downlink signal;

a2) determining a difference between the gaining node FOA and a system frequency to which the losing node and the gaining node are synchronized; and a3) determining the gaining node uplink frequency as the system frequency adjusted by a negative of the difference.

15. The method as claimed in claim 14, wherein the step of determining the gaining node uplink frequency comprises the steps of:
   a3a) determining the gaining node uplink frequency as the system frequency adjusted by the negative of the difference between the gaining node FOA and the system frequency; and
   a3b) adjusting the gaining node uplink frequency by a frequency shift equal to a second difference between a first frequency which is assigned to the CU for communications with the losing node and a second frequency which is assigned to the CU for communications with the gaining node.

16. The method as claimed in claim 11, wherein the step of handing off from the losing node to the gaining node comprises the step of using one set of communication equipment for both the uplink communications with the losing node and for the uplink communications with the gaining node.

17. A method for a communication unit (CU) to hand off from a losing node to a gaining node, wherein the CU is a radio frequency device capable of communicating with a node using an uplink signal from the CU to the node and a downlink signal from the node to the CU, the method comprising the steps of:
   a) computing a system time to which the losing node and the gaining node are synchronized;
   b) observing a gaining node time-of-arrival (TOA) of a gaining node downlink signal;
   c) calculating a first difference between the system time and the gaining node TOA;
   d) estimating a gaining node uplink time as the system time adjusted by a negative of the first difference, wherein the gaining node uplink time is a time at which the CU should transmit a gaining node uplink signal;
   e) calculating a system frequency to which the losing node and the gaining node are synchronized;
   f) observing a gaining node frequency-of-arrival (FOA) of the gaining node downlink signal;
   g) determining a second difference between the system frequency and the gaining node FOA;
   h) approximating a gaining node uplink frequency as the system frequency adjusted by a negative of the second difference, wherein the gaining node uplink frequency is a frequency at which the CU should transmit the gaining node uplink signal; and
   i) handing off from the losing node to the gaining node by ceasing uplink communications with the losing node and immediately beginning uplink communications with the gaining node at the gaining node uplink time and using the gaining node uplink frequency.

18. A communication unit (CU) capable of communicating with a node using radio frequency (RF) links comprising an uplink signal from the CU to the node and a downlink signal from the node to the CU, wherein the CU is also capable of handing off communications from a losing node to a gaining node, the CU comprising:
   an RF transmitter for sending a first uplink signal to the losing node and for sending a second uplink signal to the gaining node, wherein the CU does not send the first uplink signal and the second uplink signal simultaneously;
   an RF receiver for receiving a first downlink signal from the losing node and for receiving a second downlink signal from the gaining node; and
   a processor coupled to the RF transmitter and the RF receiver, the processor for estimating an uplink time to send the second uplink signal, wherein the uplink time is estimated from observing times-of-arrival (TOA) of signals between the communication unit and both the losing node and the gaining node, the processor further for approximating an uplink frequency to send the second uplink signal, wherein the uplink frequency is approximated from observing frequencies-of-arrival (FOA) of the signals between the communication unit and both the losing node and the gaining node and, when a handoff from the losing node to the gaining node is to occur, the processor does not perform a synchronization procedure between the CU and the gaining node and the processor is further for ceasing to send the first uplink signal and for substantially simultaneously sending the second uplink signal at the uplink time and using the uplink frequency.

19. The CU as claimed in claim 18, wherein the processor is further for estimating the uplink time by computing a system time to which the losing node and the gaining node are synchronized, commanding the RF receiver to observe a downlink time-of-arrival (TOA) of the second downlink signal, and estimating the uplink time based on the system time and the downlink TOA.

20. The CU as claimed in claim 18, wherein the processor is further for approximating the uplink frequency by calculating a system frequency to which the losing node and the gaining node are synchronized, commanding the RF receiver to observe a downlink frequency-of-arrival (FOA) of the second downlink signal, and approximating the uplink frequency based on the system frequency and the downlink FOA.

21. The CU as claimed in claim 18, wherein the RF receiver is further for measuring a frequency-of-arrival (FOA) and time-of-arrival (TOA) of the first downlink signal, and the processor is further for using the FOA to approximate the uplink frequency and for using the TOA to estimate the uplink time.

22. The CU as claimed in claim 18, wherein the losing node and the gaining node are satellites and the RF receiver and the RF transmitter are for communicating with the satellites.

* * * * *